United States Patent
Durak (10) Patent No.: US 11,429,386 B2
(45) Date of Patent: Aug. 30, 2022

(54) METHOD AND APPARATUS FOR AN ADVANCED CONVOLUTION ON ENCRYPTED DATA

(71) Applicant: Robert Bosch GmbH, Stuttgart (DE)

(72) Inventor: Betül Durak, Pittsburgh, PA (US)

(73) Assignee: ROBERT BOSCH GMBH

(*) Notice: Subject to any disclaimer, the term of this patent is extended or adjusted under 35 U.S.C. 154(b) by 496 days.

(21) Appl. No.: 16/668,562

(22) Filed: Oct. 30, 2019

(65) Prior Publication Data
US 2021/0132949 A1  May 6, 2021

(51) Int. Cl.
| | |
|---|---|
| G06F 9/54 | (2006.01) |
| G06F 9/30 | (2018.01) |
| G06F 17/14 | (2006.01) |
| G06F 17/15 | (2006.01) |
| G06F 17/16 | (2006.01) |
| G06N 3/04 | (2006.01) |

(52) U.S. Cl.
CPC ......... *G06F 9/30036* (2013.01); *G06F 9/545* (2013.01); *G06F 17/141* (2013.01); *G06F 17/15* (2013.01); *G06F 17/16* (2013.01); *G06N 3/0418* (2013.01)

(58) Field of Classification Search
None
See application file for complete search history.

(56) References Cited

U.S. PATENT DOCUMENTS

| | | | |
|---|---|---|---|
| 9,436,835 B1 | 9/2016 | Saldamli | |
| 2020/0012886 A1* | 1/2020 | Walters | G06F 21/6254 |
| 2020/0175363 A1* | 6/2020 | Lin | G06F 17/15 |

FOREIGN PATENT DOCUMENTS

EP  3461054 A1  3/2019

OTHER PUBLICATIONS

Damgård et al., "Multiparty computation from somewhat homomorphic encryption", Department of Computer Science, Berlin, 46 pages.

* cited by examiner

*Primary Examiner* — Craig C Dorais
(74) *Attorney, Agent, or Firm* — Dickinson Wright PLLC (57) ABSTRACT

An apparatus includes a processor programmed to define an input matrix and kernel matrix based upon the encrypted data, identify an algebraic structure of an encryption method applied to the encrypted data, determine a primitive root of unity in the algebraic structure in response to an input matrix size and a kernel matrix size, transform the input matrix and kernel matrix utilizing the primitive root of unity into a transformed input matrix and a transformed kernel matrix, compute an element-wise multiplication of the transformed input matrix and transformed kernel matrix, apply a reverse discrete Fourier transformation, and output a convolution of the input matrix and the kernel matrix based upon the encrypted data.

20 Claims, 5 Drawing Sheets

METHOD AND APPARATUS FOR AN ADVANCED CONVOLUTION ON ENCRYPTED DATA

TECHNICAL FIELD

The present disclosure relates to processing of encrypted data, including such data as image data or sensor data.

BACKGROUND

Secure multi-party computation (MPC) is a field in cryptography which may provide a method for many parties to jointly compute a function on a private input, such as encrypted data. In MPC, parties may obtain some "shares" of the input on which they want to compute the function. It may provide a way to keep the input private from participations of MPC. Moreover, many parties use MPC to jointly compute some functions of their interest.

On the other hand, deep learning (DL) may be a sub-field of machine learning that has issues in image recognition. The merge of MPC in deep learning settings has become more intuitive for protecting data privacy, yet able to compute with new techniques in deep learning. However, to implement DL methods to work on encrypted data as efficient as on plain data may be difficult.

SPDZ protocol may be utilized as an MPC protocol. SPDZ may utilize a standard secret sharing method in order to share the function input in a private manner. Secret sharing algorithms may be used in encryption methods. SPDZ may make it possible to apply DL computations on encrypted data in any type of form.

SUMMARY

According to one embodiment, a method of processing encrypted data includes defining an input matrix and kernel matrix based upon the encrypted data, identifying an algebraic structure of an encryption method applied to the encrypted data, determining a primitive root of unity in the algebraic structure in response to an input matrix size and a kernel matrix size, transforming the input matrix and kernel matrix utilizing the primitive root of unity into a transformed input matrix and a transformed kernel matrix, computing an element-wise multiplication of the transformed input matrix and transformed kernel matrix, applying a reverse discrete Fourier transformation, and outputting a convolution of the input matrix and the kernel matrix based upon the encrypted data.

According to a second embodiment, a computer-implemented method of processing encrypted data includes defining an input matrix and kernel matrix based upon the encrypted data, identifying an algebraic structure of an encryption method applied to the encrypted data, determining a primitive root of unity in the algebraic structure in response to an input matrix size and a kernel matrix size, transforming the input matrix and kernel matrix utilizing the primitive root of unity into a transformed input matrix and a transformed kernel matrix, computing an element-wise multiplication of the transformed input matrix and transformed kernel matrix and a reverse discrete Fourier transformation of the multiplication, and outputting a convolution of the input matrix and the kernel matrix based upon the encrypted data.

According to a third embodiment, an apparatus includes a processor programmed to define an input matrix and kernel matrix based upon the encrypted data, identify an algebraic structure of an encryption method applied to the encrypted data, determine a primitive root of unity in the algebraic structure in response to an input matrix size and a kernel matrix size, transform the input matrix and kernel matrix utilizing the primitive root of unity into a transformed input matrix and a transformed kernel matrix, compute an element-wise multiplication of the transformed input matrix and transformed kernel matrix, apply a reverse discrete Fourier transformation, and output a convolution of the input matrix and the kernel matrix based upon the encrypted data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The system and method described below proposes a method for faster convolution computation on encrypted data by utilizing Discrete Fourier Transformation (DFT). The advantages may include that the method formally defines the DFT in a general algebraic ring structure and how to integrate it for algebraic structure of the SPDZ encryption protocol. It may also analyze the complexity of the proposed method and provide its correctness. The method may also achieve up to k times speed-increases for a kernel matrix size k by k. Thus, the DFT may compute faster convolutions of encrypted data in SPDZ settings. The system and method may utilize different versions of DFT in different settings.

One of the drawbacks of deep learning (DL) in cryptographic primitives is that the computations slow down significantly because operations executed in a more complex manner on encrypted data. Specifically, DL uses a convolution layer to extract the features from an input data. In image recognition, the input image is represented as a matrix with its pixels and applies some kind of filtering with a small matrix. The computation of convolution on encrypted data may become cumbersome in many applications. In the present application, the system may take DFT and put DFT, machine learning, and encryption schemes together to run faster convolution computations on encrypted data. In an embodiment, the encryption may be performed through a specific secret sharing protocol called SPDZ. The convolution on secret shared data may speed up processing.

Figure 1:
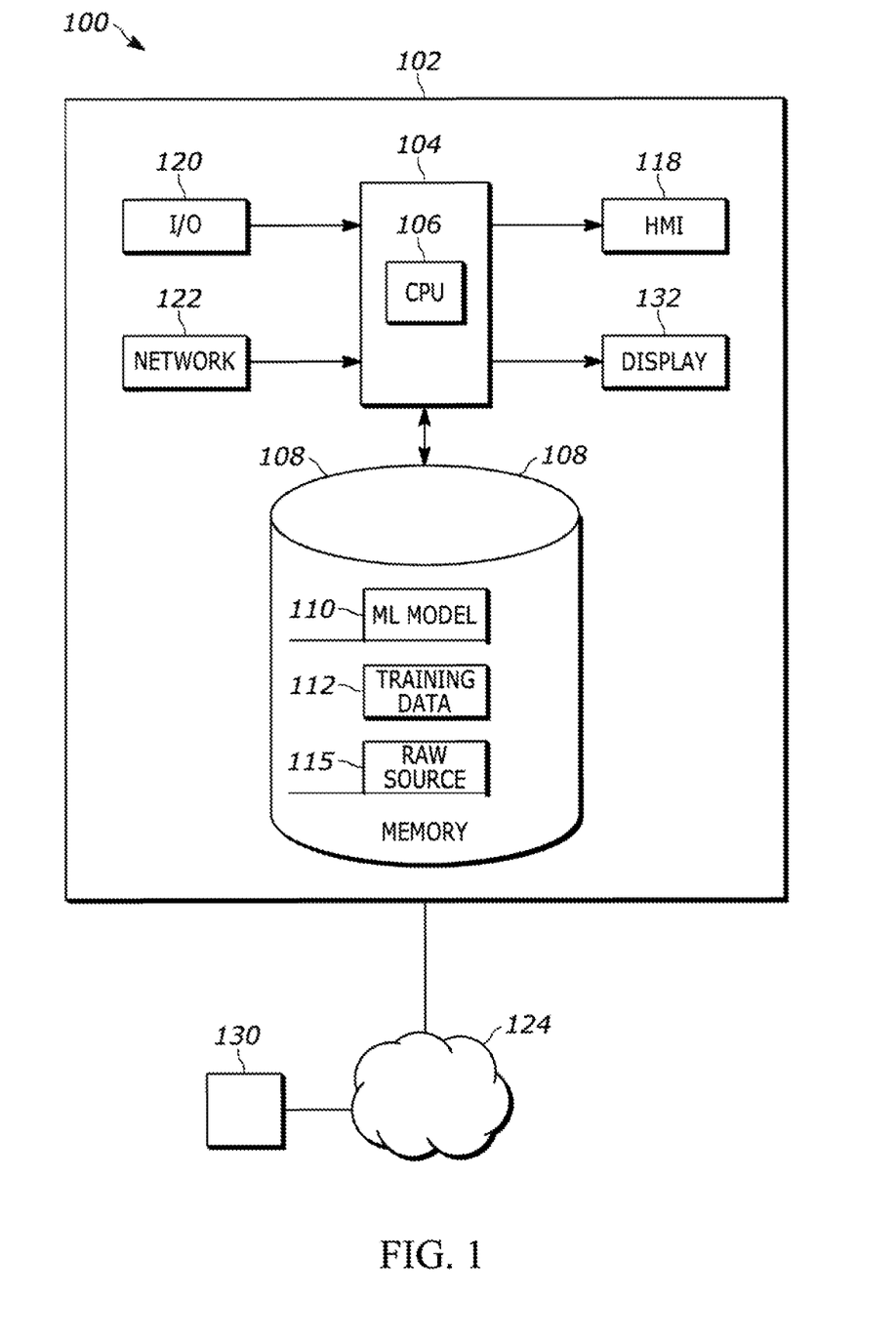
FIG. 1 depicts an exemplary data annotation system 100 to implement a system for annotating data.

FIG. 1 depicts an exemplary data annotation system 100 to implement a system. The data system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may implement a machine-learning algorithm 110 that is configured to analyze the raw source dataset 115. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). The raw source dataset 115 may also include encrypted data that is based off the video, video segments, images, text-based information, sensor data, or other types of data. In some examples, the machine-learning algorithm 110 may be a neural network algorithm that is designed to perform a predetermined function. For example, the neural network algorithm may be configured in automotive applications to identify pedestrians in video images.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source videos with and without pedestrians and corresponding presence and location information. The source videos may include various scenarios in which pedestrians are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of a pedestrian in video images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature. The raw source data 115 may be derived from a variety of sources. For example, the raw source data 115 may be actual input data collected by a machine-learning system. The raw source data 115 may be machine generated for testing the system. As an example, the raw source data 115 may include raw video images from a camera. The raw source data 115 may also include plaint data (e.g., unencrypted data) or encrypted data.

In the example, the machine-learning algorithm 110 may process raw source data 115 and generate an output. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

Figure 2:
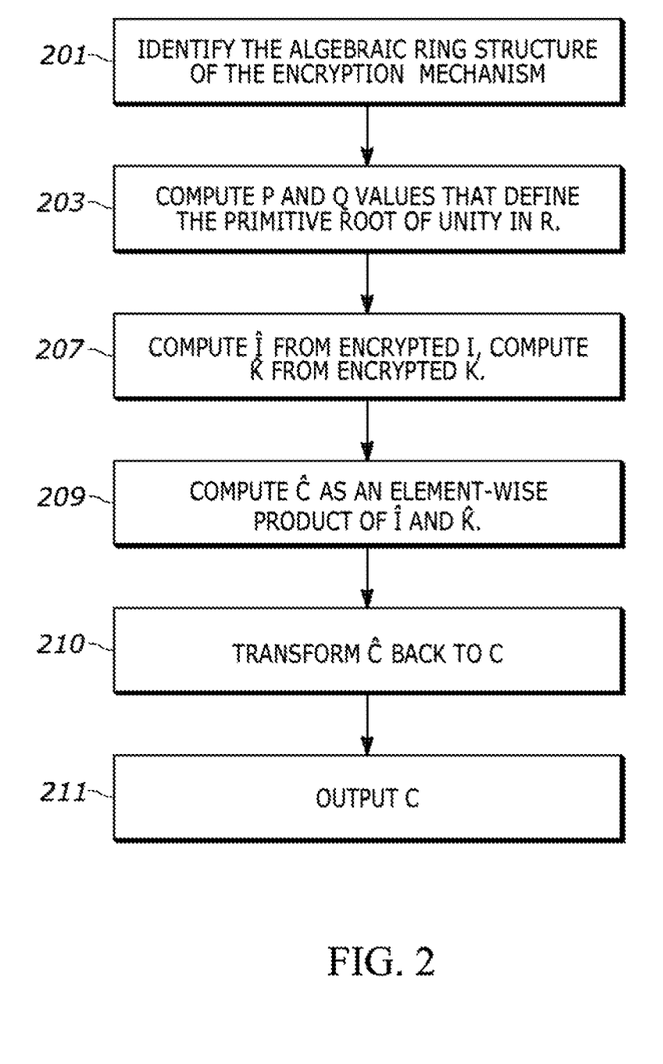
FIG. 2 depicts an exemplary flow chart of the convolution applied to encrypted data utilizing DFT.

FIG. 2 depicts an exemplary flow chart of the convolution applied to encrypted data utilizing DFT. Convolution may be a mathematical operation of two functions that produces a third function expressing how the shape of one is modified by the other. Convolution may refer to both the result function and to the process of computing it, as well as the integral of the product of the two functions after one is reversed and shifted. It may be applied on 2 dimensional matrices such as images represented in 2D, input matrix I with integer sizes M by N (i.e. number of rows by number of columns) and kernel matrix K with integer sizes a by b. Thus, I may be viewed as a function mapping a pair $(x,y) \in \{0, \ldots, M-1\}$ by $\{0, \ldots, N-1\}$ into real numbers. Similarly, K may be viewed as a function mapping a pair $(x,y) \in \{0, \ldots, a-1\}$ by $\{0, \ldots, b-1\}$ into real numbers. Circular convolution may apply when one of two aperiodic functions is convolved in a normal way with a periodic summation of the other function. Circular convolution is a mathematical way to represent normal convolution in a mathematical structure. Circular convolution must output the same result as normal convolution. For that the system may construct circular convolution $C_c$ which is equal to normal convolution C mod R where R is a ring. At step 201, the system may identify the algebraic ring structure (R) of the encryption mechanism.

For an $s \in \{0, \ldots, M-a\}$ and $t \in \{0, \ldots, N-b\}$, the normal convolution function on the input matrix and kernel matrix may be defined as:

$$C(s, t) = \sum_{x=0}^{a-1} \sum_{y=0}^{b-1} I(s + x, t + y) K(x, y)$$

C=Conv(I, K). Given that C is the convolution of I and K, when the system computes the convolution using such a formula, the number of multiplications will be ab(M−a+1)(N−b+1). Given the fact that I and K are encrypted, the number of costly multiplications that require communication between servers on encrypted data will be shown below in formula (1):

$$ab(M-a+1)(N-b+1) \qquad 1.$$

The following section below describes the disclosure which shows how to avoid making extra encrypted multiplication by transforming the encrypted data in another form.

Table 1 below may be utilized to enumerate all the notations utilized throughout the description of the disclosure:

TABLE 1

The notations table.

| Notation | Meaning |
|---|---|
| I | the input image matrix and also the function to map index of input matrix to its values. |
| K | the kernel matrix and the function to map index of kernel matrix to its values. |
| C | the convolution function of I and K. |
| Î, K̂, Ĉ | the DFT transformation of I, K, C respectively. |
| (M, N) | the number of (rows, columns) of the unpadded input matrix I. |
| (a, b) | the number of (rows, columns) of the unpadded kernel matrix I. |
| P | the closest bigger factor of (m − 1) to M. |
| Q | the closest bigger factor of (m − 1) to N. |
| m | the SPDZ prime modulus |
| (α, β) | ($P^{th}$, $Q^{th}$) primitive root of unity in the ring R |

Convolution with DFT on encrypted data may be unique given that the encrypted data includes its own algebraic structure. The system may define the encrypted input matrix in a way that can apply DFT. For example, as the system may define I and K, the system encrypts each entry of the matrix I and matrix K for the privacy of input images. Then, convolution function to apply on an input image and given kernel may mean that an input matrix may be seen as a function I to represent input image and a kernel matrix may be seen as a function K. Thus, functions I and K are defined with two variables, i.e. I(x.y) and K(x,y) where x is the row number and y is the column number in corresponding matrices. The system may apply encryption with SPDZ library to hide the data being processed. The system may use another library to "transform" these encrypted version of functions I and K into a structure where normal convolution operation (and circular convolution corresponding to this circular convolution) is still outputs the same result without this transformation. This mathematical transformation is called DFT. DFT may allow to write a function as a linear combination of characters over the group. In SPDZ algebraic structure which is a ring R, the system may work with characters that are defined from a group to a ring, as opposed to complex numbers. Then, the system may need to define a $P^{th}$ (respectively $Q^{th}$) primitive root of unity (in SPDZ ring R) denoted as α (respectively β) in order to utilize DFT.

At step 203, the system computes the $P^{th}$ primitive root of unity in R. Given an integer P, the system may allow $\alpha$ as a $P^{th}$ root of unity in the ring. The system may require that $\alpha^i - 1$ is invertible for all of $i \in \{1, \ldots, P-1\}$.

At step 203, the system computes the $Q^{th}$ primitive root of unity in R. Given an integer Q, the system may allow $\beta$ to be a $Q^{th}$ root of unity in the ring. The system may assume $\beta^j - 1$ is invertible for all $j \in \{1, \ldots, Q-1\}$. The system may take the encrypted input matrix I and kernel matrix K sizes M by N and a by b respectively, and pad them to size of P by Q through the DFT transformation.

As defined in Table 1, P may be the closest bigger prime number to M, which is the number of rows of the input matrix I. The input matrix I may include encrypted data, such as data from an image obtained by a camera or image capturing device or sensor data obtained from a sensor. The SPDZ protocol software may applies calculations to encrypt the input matrix I.

The method may make sure that an equality in the encryption structure (ring) implies an equality in the relevant values. Thus, when the system transforms the encrypted data, an element of a typical convolution may be a dot product over ab terms. Each term may be bound by $(B-1)^2$. If the modulus is bigger than $ab(B-1)^2+1$, then an equality modulus means that the values are equal. If the modulus is lower, than the system processing may not be sure if they are equal. In SPDZ library, encryption data are represented with a fixed point representation called sfix. On the other hand, the DFT transformation works with the integer representation (called sint) of encrypted sfix values. Therefore, the upper bound B should be the upper bound on elements after conversion from sfix to sint. In a SPDZ library that uses 20 bits to represent an integer part of the sfix values, it may utilize 20 bits to represent the fractional value. Thus, each element of encrypted matrix will be multiplied by $2^{20}$ to obtain the integer representation of the encrypted values. Thus, if all the values of I and K are in the $\{0, \ldots, B-1\}$ range, the modulus should be at least $ab(B-1)^2+1$. In the instant application, the ring is $R = Z_m$ for a given modulus m which is a prime number.

The system should take $P \geq M$ and $Q \geq N$ as small as possible so that the computational overhead on encrypted data is small. However, the system first should determine that primitive roots of unity corresponding to P and Q exist. For example, the system can take factors of $\phi(m)$. What follows explain further how to identify P and Q values.

The SPDZ ring may be $Z_m$ with m being prime, thus $\phi(m) = m-1$. Thus the set $Z^*_m$ has a unity order of m-1 when the primitive root is computed. From the Lagrange theorem, the order of any element in the group may always have the factor of the order of the group, which is m-1. Thus, in order to a have a $P^{th}$ primitive root of unity $\alpha \in Z^*_m$, we must have P as the factor of m-1. The system may pick a generator g of $Z^*_m$. The system may then compute a as:

$$\alpha^{\frac{m-1}{P}}$$

The system should make sure that a is not equal to 1. As such, a is an invertible modulo m because m is prime. Thus, the computation of a primitive root of unity over the ring $Z_m$ when m is prime can be done in a straightforward way.

At step 207, the system may determine $\hat{I}$ and $\hat{K}$. The system may determine $\hat{I}$ and $\hat{K}$ of the encrypted data without requiring any expensive computations such as exchanges of data between servers. Thus, as opposed to normal convolution computation that may require data to be exchanged between servers during the convolution process of encrypted data, determining $\hat{I}$ and $\hat{K}$ in the embodiment disclosed may not require data to be exchanged between servers, and instead carried out on a single server very fast as if it operates on non-encrypted data. Thus, this step may involve operations with publicly available data that does not cost as much as operating on encrypted data in terms of computational power.

The DFT transformation of the input image matrix may be:

$$\hat{I}(u,v) = \Sigma_{s=0}^{P-1} \Sigma_{t=0}^{Q-1} \alpha^{us} \beta^{vt} I(s,t), \text{ for all } (u,v) \in \{0, \ldots, P-1\} \text{ by } \{0, \ldots, Q-1\}.$$

where only the function/matrix of I is encrypted, $\alpha$ and $\beta$ values are publicly available.

The DFT transformation for the kernel matrix may utilize the similar formula:

$$\hat{K}(u,v) = \Sigma_{s=0}^{a-1} \Sigma_{t=0}^{b-1} \alpha^{us} \beta^{vt} K(s,t), \text{ for all } (u,v) \in \{0, \ldots, P-1\} \text{ by } \{0, \ldots, Q-1\}.$$

where only the function/matrix of K is encrypted, $\alpha$ and $\beta$ values are publicly available.

The DFT transformation of the kernel matrix and the input image matrix may be utilized to determine the convolution function.

At step 209, the system may compute $\hat{C}$ (e.g., C-hat, on the DFT transformation of the convolution function of I and K). $\hat{C}$ may be the same as $\hat{I} * \hat{K}$, where * is the element-wise product. The system may utilize a controller or processor to compute C from $\hat{C}$ at as follows:

$$C(s,t) = \frac{1}{PQ} \sum_{u=0}^{P-1} \sum_{v=0}^{Q-1} \alpha^{-us} \beta^{-vt} \hat{C}(u,v),$$

for all $(s,t) \in \{0, \ldots, M-1\}$ by $\{0, \ldots, N-1\}$.

It is necessary for system to make sure DFT convolution computes the correct output with circular convolution. As in the normal convolution, DFT convolution should also make sure DFT circular convolution on encrypted data is defined well. It may be defined as:

$$\hat{C}_c = \hat{I}_p \times \hat{K}_p$$

Namely, $\hat{C}_c(u,v) = \hat{I}_p(u,v) \times \hat{K}_p(u,v)$ for all $(u,v) \in \{0, \ldots, P-1\}$ by $\{0, \ldots, Q-1\}$. Thus, the system may compute $\hat{C}_c$ with $\hat{I}_p$ and $\hat{K}_p$ being computed freely. Furthermore, the system may compute $\hat{C} = \hat{I}_p \times \hat{K}_p$ with PQ ring multiplications. At step 210, the system may compute $C_c$ from $\hat{C}_c$ freely. The number of expensive multiplications may be reduced from $ab(M-a+1)(N-b+1)$ to PQ, which is roughly divided by ab (e.g., the number of rows and columns of the unpadded kernel matrix). Such an operation may involve publicly available data that does not utilize resources as much as operating on encrypted data in terms of computational power.

At step 211, the system may output C. The output may be utilized in a deep learning system utilizing a neural network. For example, the output may help the neural network categorize image data.

As such, the complexity estimate may be reduced on processing of a server's processor. The online phase of the SPDZ algorithm for multiplication may have a party $S_1$ send $u_1 = x_1 - a_1$ and $v_1 = y_1 - b_1$. The party $S_2$ may send $u_2 = x_2 - a_2$ and $v_2 = y_2 - b_2$. Such a calculation may include 4 subtractions. The $S_1$ and $S_2$ compute $u = v_1 + v_2$ and $v = v_1 + v_2$. This may include 2 subtractions which each means 4 subtractions. $S_1$ computes $z_1 = u.v_1 + a_1.v + b_1.u + c_1$. This may include 3 additions and 3 multiplications. $S_2$ computes $z_2 = u.v_2 + a_2.v + b_2.u + c_2$. This may include 3 additions and 3 multiplications. Thus, in total it may require 8 subtractions, 6 additions, and 6 multiplications. The system may count the subtraction and addition as one category.

Assuming a multiplication of two shares is equivalent to 14 additions and 6 multiplications, a rough estimate of what occurs during the online phase, we can apply the convolution formula costs at $ab(M-a+1)(N-b+1)(14t_+ + 5t_x)$. To compute the DFT of S, we can compute the table of:

$$S'(u, v) = \sum_{s=0}^{P-1} \alpha^{us} S(s, v)$$

When DFT is applied on the encrypted data, the number of expensive multiplications that requires server communications become $$2PN(M+Q)(t_+ + t_x) + Pb(a+Q)(\ ) + PQ(14t_+ + 6t_x) \qquad 2.$$

For a=b=3, the ratio of equation (2) and equation (1) corresponding to expensive encrypted multiplications between DFT convolution and normal convolution may be as small as $$\rho = \frac{9(M-2)(N-2)(14t_+ + 6t_x)}{PQ(14t_+ + 6t_x)} = 9\left(\frac{M}{P} - \frac{2}{P}\right)\left(\frac{N}{Q} - \frac{2}{Q}\right) \approx 9\frac{MN}{PQ}$$

Figure 3:
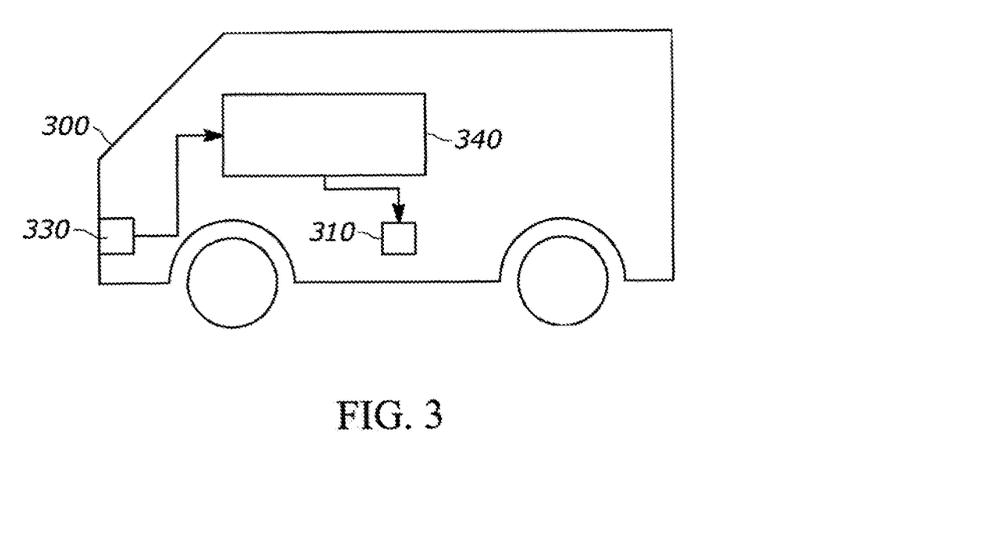
FIG. 3 illustrates a computing system controlling an at least partially autonomous robot.

FIG. 3 shows an embodiment in which a computing system 340 is used to control an at least partially autonomous robot, e.g. an at least partially autonomous vehicle 300. The computing system 340 may be similar to that computing system described in FIG. 1. Sensor 330 may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in vehicle 300.

Alternatively or additionally sensor 330 may comprise an information system for determining a state of the actuator system. The sensor 330 may collect sensor data or other information to be used by the computing system 340. One example for such an information system is a weather information system which determines a present or future state of the weather in environment. For example, using input signal x, the classifier may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 310, which may be integrated in vehicle 300, may be given by a brake, a propulsion system, an engine, a drivetrain, or a steering of vehicle 300. Actuator control commands may be determined such that actuator (or actuators) 310 is/are controlled such that vehicle 300 avoids collisions with said detected objects. Detected objects may also be classified according to what the classifier deems them most likely to be, e.g. pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 330, preferably an optical sensor, to determine a state of plants in the environment. Actuator 310 may be a nozzle for spraying chemicals. Depending on an identified species and/or an identified state of the plants, an actuator control command A may be determined to cause actuator 310 to spray the plants with a suitable quantity of suitable chemicals.

In even further embodiments, the at least partially autonomous robot may be given by a domestic appliance (not shown), like e.g., a washing machine, a stove, an oven, a microwave, or a dishwasher. Sensor 330, e.g. an optical sensor, may detect a state of an object which is to undergo processing by the household appliance. For example, in the case of the domestic appliance being a washing machine, sensor 330 may detect a state of the laundry inside the washing machine. Actuator control signal A may then be determined depending on a detected material of the laundry.

Figure 4:
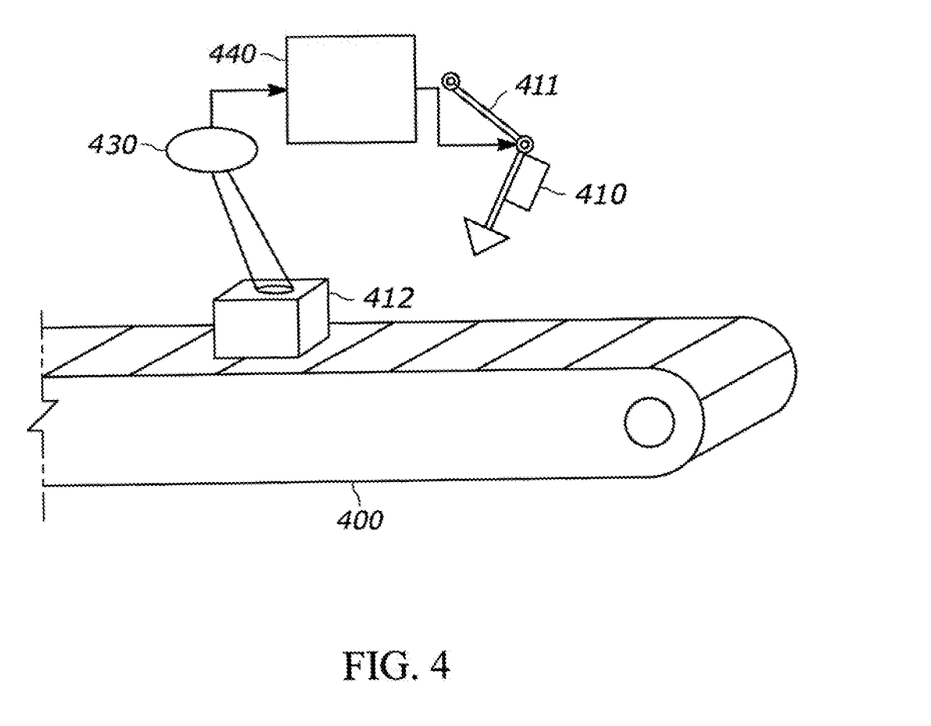
FIG. 4 is an embodiment in which computer system 40 is used to control a manufacturing machine.

Shown in FIG. 4 is an embodiment in which computer system 440 is used to control a manufacturing machine 411, e.g. a punch cutter, a cutter or a gun drill) of a manufacturing system 400, e.g. as part of a production line. The control system 440 controls an actuator 410 which in turn control the manufacturing machine 411.

Sensor 430 may be given by an optical sensor which captures properties of e.g. a manufactured product 412. The sensor 430 may collect data regarding such properties of the manufacturer product and operation of actuator 410. Classifier may determine a state of the manufactured product 412 from these captured properties. Actuator 410 which controls manufacturing machine 411 may then be controlled depending on the determined state of the manufactured product 412 for a subsequent manufacturing step of manufactured product 412. Or, it may be envisioned that actuator 410 is controlled during manufacturing of a subsequent manufactured product 412 depending on the determined state of the manufactured product 412.

Figure 5:
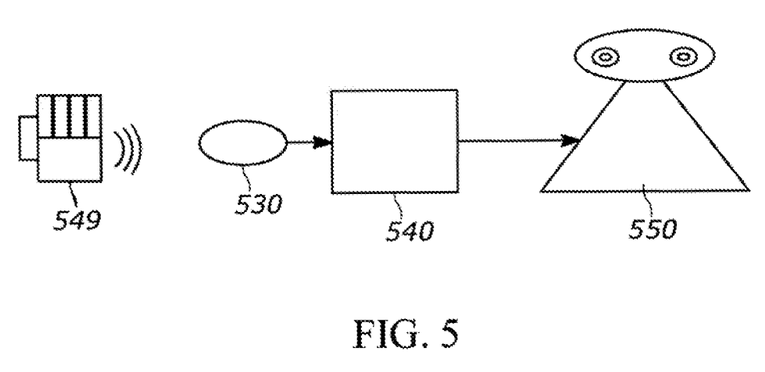
FIG. 5 illustrates a computing system controlling an automated personal assistant.

Shown in FIG. 5 is an embodiment in which computer system 540 is used for controlling an automated personal assistant 550. Sensor 530 may be an optic sensor, e.g. for receiving video images of a gestures of user 549. Alternatively, sensor 530 may also be an audio sensor e.g. for receiving a voice command of user 549.

Control system 540 then determines actuator control commands A for controlling the automated personal assistant 550. The actuator control commands A are determined in accordance with sensor signal S of sensor 530. Sensor signal S is transmitted to the control system 540. For example, classifier may be configured to e.g. carry out a gesture recognition algorithm to identify a gesture made by user 549. Control system 540 may then determine an actuator control command A for transmission to the automated personal assistant 550. It then transmits said actuator control command A to the automated personal assistant 550.

For example, actuator control command A may be determined in accordance with the identified user gesture recognized by classifier. It may then comprise information that causes the automated personal assistant 550 to retrieve information from a database and output this retrieved information in a form suitable for reception by user 549.

In further embodiments, it may be envisioned that instead of the automated personal assistant 550, control system 540 controls a domestic appliance (not shown) controlled in accordance with the identified user gesture. The domestic appliance may be a washing machine, a stove, an oven, a microwave or a dishwasher.

Figure 6:
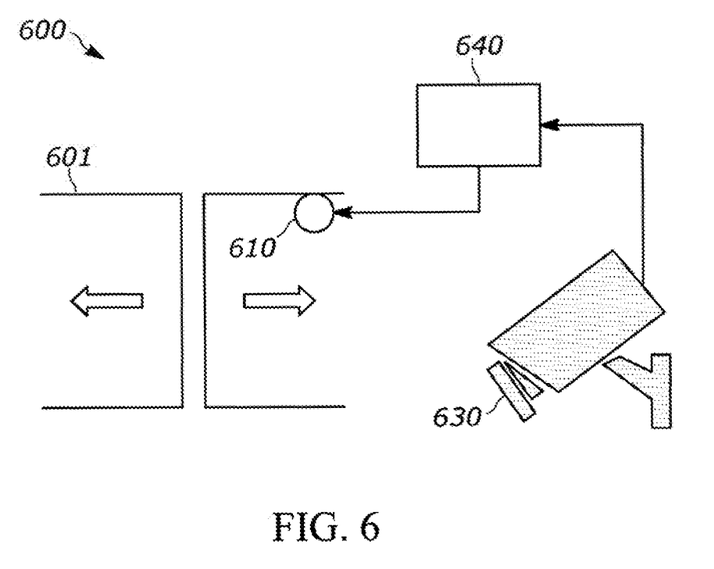
FIG. 6 illustrates a computing system the control system controlling an access control system.

Shown in FIG. 6 is an embodiment in which computing system controls an access control system 600. Access control system may be designed to physically control access. It may, for example, comprise a door 601. Sensor 630 is configured to detect a scene that is relevant for deciding whether access is to be granted or not. The sensor 630 may collect image data or video data related to the scene. It may for example be an optical sensor for providing image or video data, for detecting a person's face. Classifier may be configured to interpret this image or video data e.g. by matching identities with known people stored in a database, thereby determining an identity of the person. Actuator control signal A may then be determined depending on the interpretation of classifier, e.g. in accordance with the determined identity. Actuator 610 may be a lock which grants access or not depending on actuator control signal A. A non-physical, logical access control is also possible.

Figure 7:
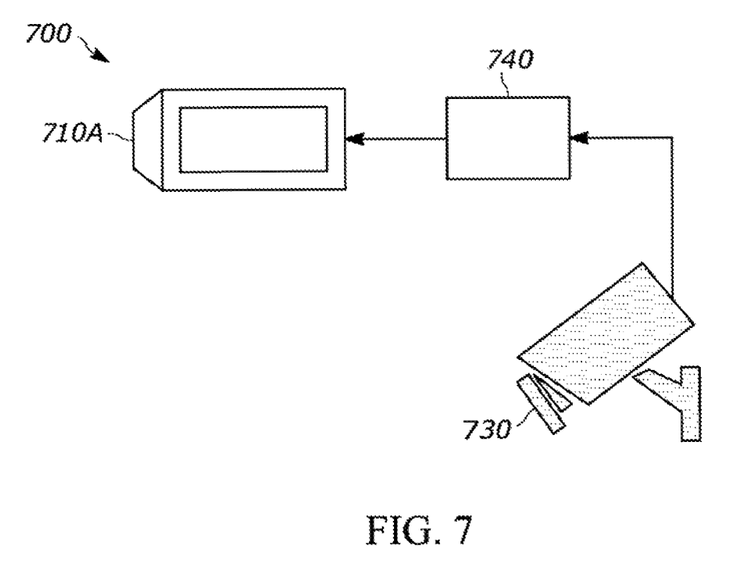
FIG. 7 illustrates a computing system the control system controlling a surveillance system.

Shown in FIG. 7 is an embodiment in which computing system 740 controls a surveillance system 700. This embodiment is largely identical to the embodiment shown in FIG. 5. Therefore, only the differing aspects will be described in detail. Sensor 730 is configured to detect a scene that is under surveillance. The sensor 730 may collect image data or video data related to the scene. The computing system does not necessarily control an actuator 710, but a display 710*a*. For example, the machine learning system may determine a classification of a scene, e.g. whether the scene detected by optical sensor 730 is suspicious. Actuator control signal A which is transmitted to display 710*a* may then e.g. be configured to cause display 710*a* to adjust the displayed content dependent on the determined classification, e.g. to highlight an object that is deemed suspicious by machine learning system.

Figure 8:
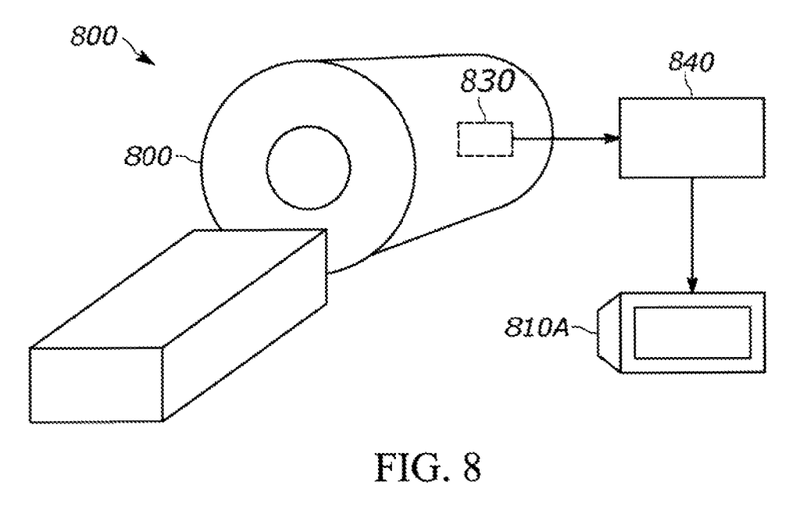
FIG. 8 illustrates a computing system the control system controlling an imaging system.

Shown in FIG. 8 is an embodiment of a computing system 840 for controlling an imaging system 800, for example an MRI apparatus, x-ray imaging apparatus or ultrasonic imaging apparatus. Sensor 830 may, for example, be an imaging sensor. Machine learning system may then determine a classification of all or part of the sensed image. The computing system 840 may collect data related to the images affiliated with the x-ray imaging or ultrasonic imaging. Actuator control signal A may then be chosen in accordance with this classification, thereby controlling display 810*a*. For example, machine learning system may interpret a region of the sensed image to be potentially anomalous. In this case, actuator control signal A may be determined to cause display 810*a* to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of processing encrypted data, comprising:
defining an input matrix and kernel matrix based upon the encrypted data;
identifying an algebraic structure of an encryption method applied to the encrypted data;
determining a primitive root of unity in the algebraic structure in response to an input matrix size and a kernel matrix size;
transforming the input matrix and kernel matrix utilizing the primitive root of unity into a transformed input matrix and a transformed kernel matrix;
computing a computation of an element-wise multiplication of the transformed input matrix and transformed kernel matrix;
applying a reverse discrete Fourier transformation to the computation; and
outputting a convolution of the input matrix and the kernel matrix based upon the encrypted data.

2. The method of claim 1, wherein the encrypted data includes sensor data.

3. The method of claim 1, wherein the encrypted data includes image data.

4. The method of claim 1, wherein the method includes encrypting the input matrix and kernel matrix is accomplished utilizing a SPDZ protocol.

5. The method of claim 1, wherein the input matrix and the kernel matrix are different sizes.

6. The method of claim 5, wherein the kernel matrix is smaller than the input matrix.

7. The method of claim 1, wherein the primitive root of unity are publicly available values.

8. The method of claim 1, wherein the output of the reverse discrete Fourier transformation is an original bit structure of the encrypted data.

9. The method of claim 1, wherein the convolution utilizes a same encryption protocol as the encrypted data.

10. A computer-implemented method of processing encrypted data, comprising:
    defining an input matrix and kernel matrix based upon the encrypted data;
    identifying an algebraic structure of an encryption method applied to the encrypted data;
    determining a primitive root of unity in the algebraic structure in response to an input matrix size and a kernel matrix size;
    transforming the input matrix and kernel matrix utilizing the primitive root of unity into a transformed input matrix and a transformed kernel matrix;
    computing an element-wise multiplication of the transformed input matrix and transformed kernel matrix and a reverse discrete Fourier transformation of the multiplication; and
    outputting a convolution of the input matrix and the kernel matrix based upon the encrypted data.

11. The computer-implemented method of claim 10, wherein the deterring the input matrix and kernel matrix is accomplished utilizing a SPDZ protocol.

12. The computer-implemented method of claim 10, wherein the input matrix includes a first size with a first row and column, and the kernel matrix is a second size with a second row and second column, wherein the convolution is output with a third size including a third row that is larger than a difference between the first row and second row, and a third column that is larger than a difference between the first column and second column.

13. The computer-implemented method of claim 10, wherein the encrypted data includes sensor data.

14. The computer-implemented method of claim 10, wherein the encrypted data includes image data.

15. An apparatus, comprising:
    a processor programmed to:
    define an input matrix and kernel matrix based upon the encrypted data;
    identify an algebraic structure of an encryption method applied to the encrypted data;
    determine a primitive root of unity in the algebraic structure in response to an input matrix size and a kernel matrix size;
        transform the input matrix and kernel matrix utilizing the primitive root of unity into a transformed input matrix and a transformed kernel matrix;
    computing an element-wise multiplication of the transformed input matrix and transformed kernel matrix;
    apply a reverse discrete Fourier transformation to the computation; and
    output a convolution of the input matrix and the kernel matrix based upon the encrypted data.

16. The apparatus of claim 15, wherein the encrypted data includes sensor data.

17. The apparatus of claim 15, wherein the encrypted data includes image data.

18. The apparatus of claim 15, wherein the controller is further configured to determine the convolution input matrix and convolution kernel matrix on the encrypted data at a single server.

19. The apparatus of claim 15, wherein the controller is configured to determine the input matrix and kernel matrix utilizing a SPDZ protocol.

20. The apparatus of claim 15, wherein the input matrix includes a first size with a first row and column, and the kernel matrix is a second size with a second row and second column, wherein the convolution is output with a third size including a third row that is larger than a difference between the first row and second row, and a third column that is larger than a difference between the first column and second column.

* * * * *